(12) United States Patent
Richardson-Bunbury et al.

(10) Patent No.: US 7,729,901 B2
(45) Date of Patent: Jun. 1, 2010

(54) SYSTEM FOR CLASSIFYING WORDS

(75) Inventors: David Richardson-Bunbury, London (GB); Soren Riise, Ruislip (GB); Devesh Patel, Ruislip (GB); Eugene H. Stipp, Battersea (GB); Paul J. Grealish, Wood Green (GB)

(73) Assignee: Yahoo! Inc., Sunnyvale, CA (US)

( * ) Notice: Subject to any disclaimer, the term of this patent is extended or adjusted under 35 U.S.C. 154(b) by 670 days.

(21) Appl. No.: 11/314,166

(22) Filed: Dec. 13, 2005

(65) Prior Publication Data

US 2007/0136048 A1 Jun. 14, 2007

(51) Int. Cl.
*G06F 17/27* (2006.01)
*G06F 17/20* (2006.01)

(52) U.S. Cl. .............................. 704/9; 704/1
(58) Field of Classification Search ........................ None
See application file for complete search history.

(56) References Cited

U.S. PATENT DOCUMENTS

| | | | | |
|---|---|---|---|---|
| 5,418,717 | A * | 5/1995 | Su et al. ..................... | 704/9 |
| 7,269,546 | B2 * | 9/2007 | Stensmo ..................... | 704/9 |
| 7,366,666 | B2 * | 4/2008 | Balchandran et al. ....... | 704/236 |
| 2004/0261021 | A1 * | 12/2004 | Mittal et al. ................. | 715/517 |
| 2005/0256715 | A1 * | 11/2005 | Okimoto et al. ............. | 704/257 |
| 2007/0106499 | A1 * | 5/2007 | Dahlgren et al. ............. | 704/10 |

\* cited by examiner

*Primary Examiner*—Matthew J Sked
(74) *Attorney, Agent, or Firm*—Brinks Hofer Gilson & Lione

(57) ABSTRACT

A system is disclosed for determining probable meanings of a word. A prior probability is established of the probable meanings of the word. A context frequency probability is established of the probable meanings of the word. The probability that each meaning is a correct meaning may be provided in accordance with both the prior probability and the context frequency probability.

20 Claims, 9 Drawing Sheets

SYSTEM FOR CLASSIFYING WORDS

TECHNICAL FIELD

The present embodiments relate generally to document classification, and more particularly relates to identifying the meaning of words.

BACKGROUND

In document classification, a document may be assigned to one or more categories, based on its contents. A recent use of document classification techniques has been spam filtering which tries to discern E-mail spam messages from legitimate emails. Document classification tasks can be supervised, where some external mechanism, such as human feedback, provides information on the correct classification for the documents, and unsupervised, where the classification is done without reference to external information. Document classification techniques include naive Bayes classifier, latent semantic indexing, support vector machines, and approaches based on natural language processing.

SUMMARY

By way of introduction, the embodiments described below include a system for determining probable meanings of a word. In a first aspect, a prior probability is established of the probable meanings of the word. A context frequency probability is established of the probable meaning of the word. The probability that each meaning is a correct meaning is provided in accordance with both the prior probability and the context frequency probability.

In a second aspect, an actual meaning of names is trained. A name to be trained is identified. Texts are collected that may include the name. An ambiguity level is identified of the name from the search. An input is obtained regarding the name as used in the text. Results are analyzed based on the inputs to generate statistics about probable meanings of the name.

In a third aspect, a double-sided context frequency values are analyzed. A combine function and an inverse combine function are applied to determine a resulting value. Whether the resulting value differs from a neutral context frequency is determined. The double-sided context frequency value is used if the resulting value differs from the neutral context frequency.

In a forth aspect, a probable meaning of a word is determined. A document classifier is determined. The document classifier is applied across a number of documents. Probabilities are calculated for different meanings of the word.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Nothing in this section should be taken as a limitation on those claims. Further aspects and advantages are discussed below in conjunction with the preferred embodiments.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

DETAILED DESCRIPTION

In document classification, there may be a need to generate accurate statistics from very small samples of data. There may also be a need to avoid the assumption that the document classification statistics are statistically independent, when they may not be. A need may also exist to reduce the tedious nature of providing sufficient human input to generate a large enough training set for the classification.

The principles described herein may be embodied in many different forms. The system may enable a better distinction or disambiguation between different possible meanings of words. For explanation purposes, the system is described in terms of determining potential place names within text documents. At least a portion of the system may utilize a reduced amount of human input to generate statistics that enable the system to distinguish the meaning words better. The system may also use statistics to identify which words have a meaning that may be more uncertain than others and therefore may merit further investigation. For the sake of explanation, the system is described as used in a network environment, but the system may also operate outside of the network environment.

Figure 1:
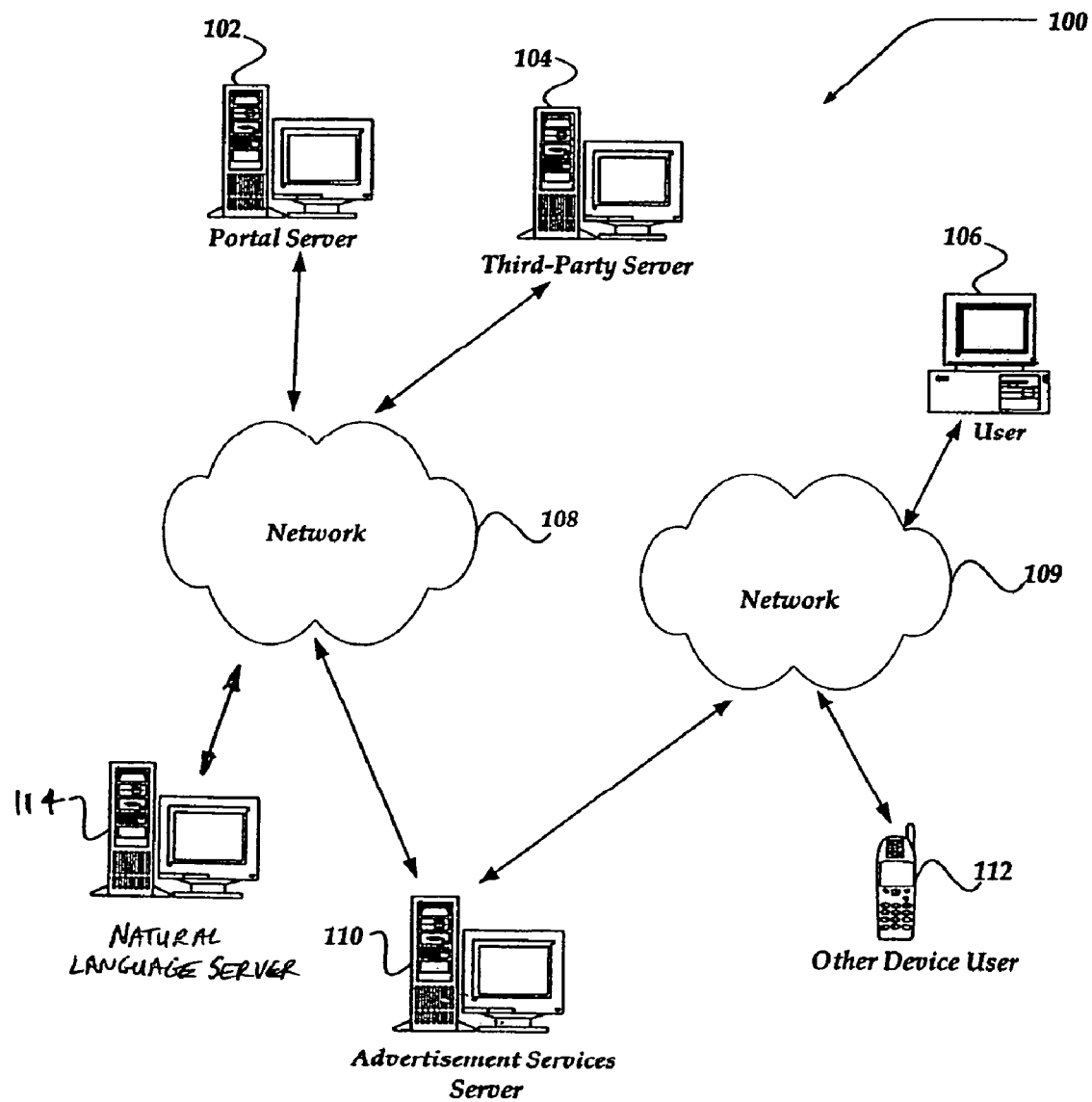
FIG. 1 provides a simplified view of a network environment including a natural language server.

FIG. 1 provides a simplified view of a network environment 100 in which the system may operate. Not all of the depicted components may be required and some embodiments may include additional components not shown in the figure. Variations in the arrangement and type of the components may be made without departing from the spirit or scope of the claims as set forth herein.

In FIG. 1, environment 100 includes a natural language server 114, which may provide for classification of documents and words within documents. The natural language server 114 may also be used outside of the environment 100 for other implementations. The environment 100 may also include an advertisement services server 110, which may provide a platform for selection, optimization, and/or distribution of advertisements for inclusion in pages, such as web pages. Additionally or alternatively, the natural language server 114 and the advertisements services server 110 may be implemented together with the same physical server. Web pages may be provided to the natural language server 114, the advertisement services server 110 and other users by a portal server 104 and/or a third-party server 102.

Some or all of the natural language server 114, the advertisement services server 110, portal server 104, and third-party server 102 may be in communication with each other by way of a network 108. The advertisement services server 110 and portal server 104 may each represent multiple linked computing devices, and multiple third-party servers, such as third-party server 102, may be included in environment 100. Network 108 may be regarded as a public or private network connection and may include, for example, a virtual private network or an encryption or other security mechanism employed over the public Internet, or the like.

In FIG. 1, some users are represented by a user device 106, depicted as a conventional personal computer, and/or other device such as a mobile user device 112, including a network-enabled mobile phone, personal digital assistant (PDA), pager, network-enabled television, digital video recorder, such as TIVO, and/or automobile. User device 106 and mobile user device 112 are represented by user-interactive devices that typically run browser applications, and the like, to display requested pages received over a network. The user may be a consumer of goods of services that is searching for a business such as a business of the advertiser. Such devices are in communication with portal server 104 and/or third-party server 102 by way of network 109. Network 109 may include the Internet and may include all or part of network 108; network 108 may include all or part of network 109.

Portal server 104, third-party server 102, advertisement services server 110, user device 106, and mobile user device 112 represent computing devices of various kinds. Such computing devices may generally include any device that is configured to perform computation and that is capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. For example, user device 106 may be configured to execute a browser application that employs HTTP to request information, such as a web page, from a web server, which may be a process executing on portal server 104 or third-party server 102.

Networks 108, 109 may be configured to couple one computing device to another computing device to enable communication of data between the devices. Networks 108, 109 may generally be enabled to employ any form of machine-readable media for communicating information from one device to another. Each of networks 108, 109 may include one or more of a wireless network, a wired network, a local area network (LAN), a wide area network (WAN), a direct connection such as through a Universal Serial Bus (USB) port, and the like, and may include the set of interconnected networks that make up the Internet. Networks 108, 109 may include any communication method by which information may travel between computing devices.

Figure 2:
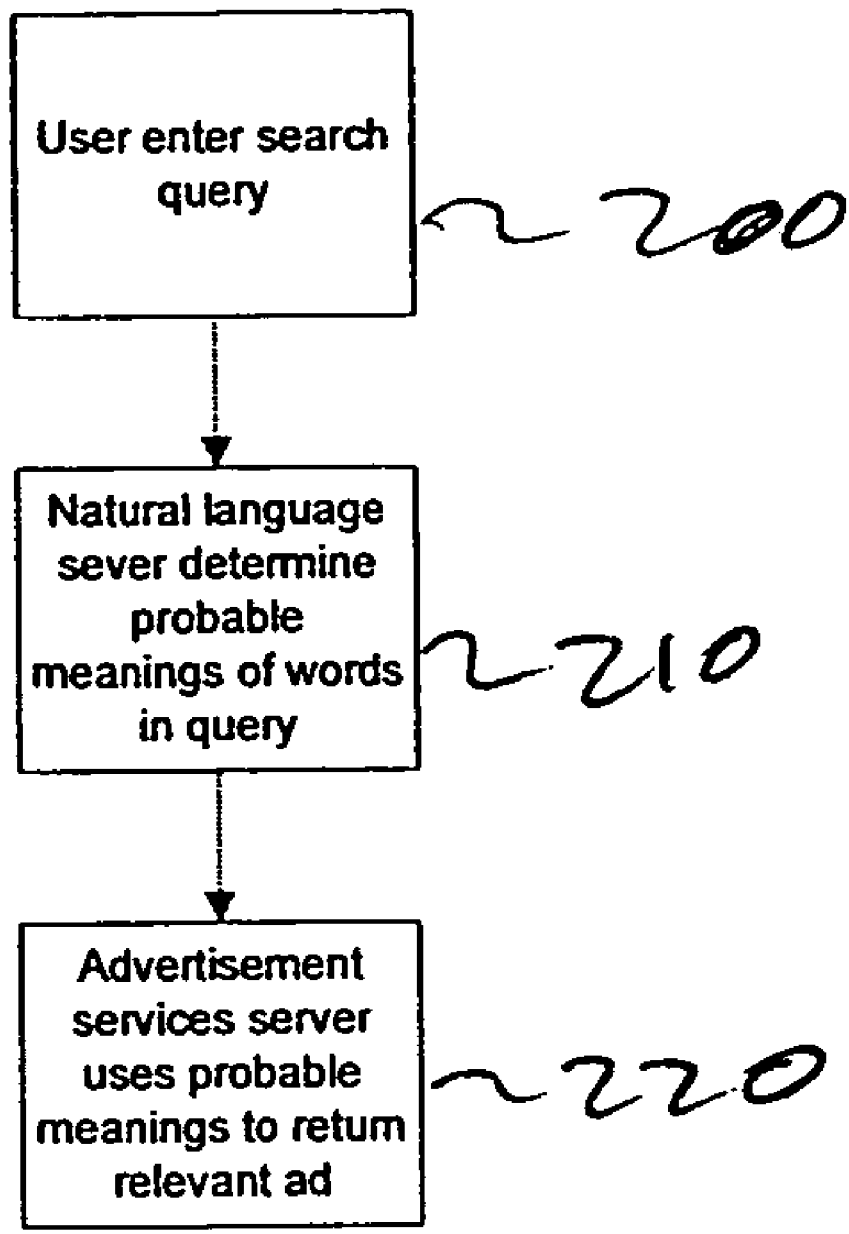
FIG. 2 is a flow chart illustrating a use of the natural language server.

FIG. 2 is a flow chart illustrating a use of the natural language server 114. At block 200, a user 106, 112 may enter a search query into a page of the browser. The embodiments are not limited to the analysis of search queries, however, the natural language server 114 may analyze words input in other ways too. Moreover, the words may be inputted with a keypad of a computer or in other ways, such as voice recognition of a computer or other input devices such as a voice recognition module of an automobile.

The input may be entered into one or more fields on a page of a search provider (e.g. FIG. 3), such as a search provider of the advertisement services server 110 or third-party server 104. At block 210, the natural language server 114 may analyze the words of the search query to provide information about one or more probable meanings of the words. For example, if the word is Gary, the natural language server 114 may give the possible meaning of the word being the name of a person or a place. If the word is 'apple', the natural language server 114 may be used to determine if the word relates to a fruit, an APPLE computer or an APPLE IPOD. If the word is 'key', the natural language server 114 may be used to determine if the word relates to music or a lock. If the word is 'orange', the natural language server 114 may be used to determine if the word relates to a county, a fruit, or a name of a restaurant, etc. If the word 'Gary' in the search query is meant by the user to be the name of a place, the natural language server 114 may determine the probability that the place is a city or a county, and which state the city or county may be located.

Having generated all the statistics, the analysis may be used to make a best estimate of the likely meaning of each potential name. This output may then be used in a variety of ways. Web pages may be indexed to a search. News stories location may be plotted on a map. Geographically relevant advertisements may be placed on a web page. Enhanced statistics may be calculated for use in query analysis. Search result listings may be presented to the user in accordance with the probabilities. For example, a result that corresponds to a meaning having the highest probability may be listed first. The natural language server 114 may also be used with other implementations, such as to present ads for pay-for-placement, cost-per-click, pay-per-call and pay-per-act type services. At block 220, the advertisement server 220 may use the information to send relevant ads to the user. For example, if the word is meant to be the place "Gary, Indiana' it may not be relevant to send ads related to 'Gary's ice cream' in California.

Figure 3:
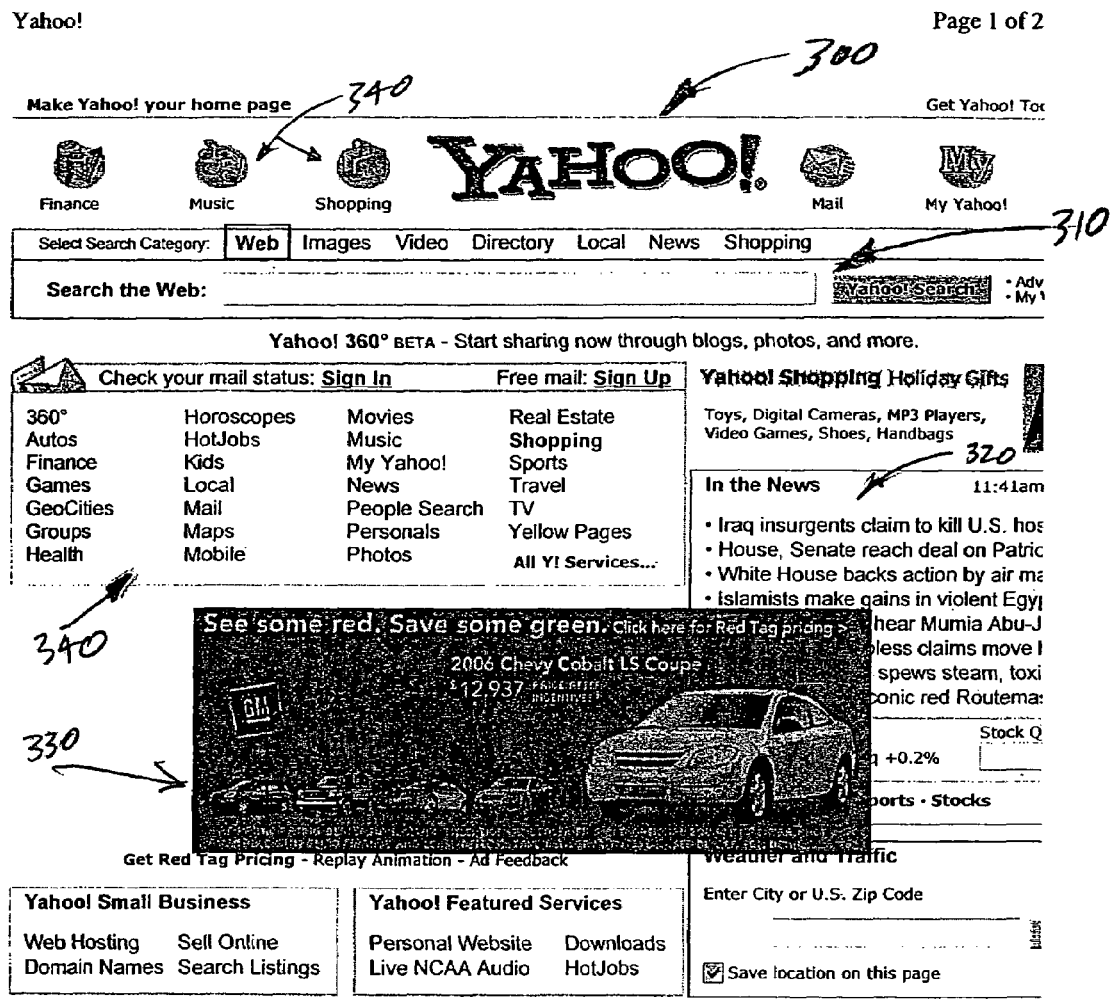
FIG. 3 is an exemplary screen shot of a web page that may be displayed by a service provider.

FIG. 3 is an exemplary screen shot of a web page 300 that may be displayed by a service provider. The web page 300 may include a field 310 for a user to enter a search query. The field 310 may be divided into one or more fields, such as having a separate field for a user to enter a location. Other part of the web page 300 may include news highlights 320, ads 330, and links 340 to other features provided by the service provider. The natural language server 114 may parse the words entered into the field 310 to analyze the words separately and in the context of the other words of the of the search query, as described in more detail below.

Figure 4:
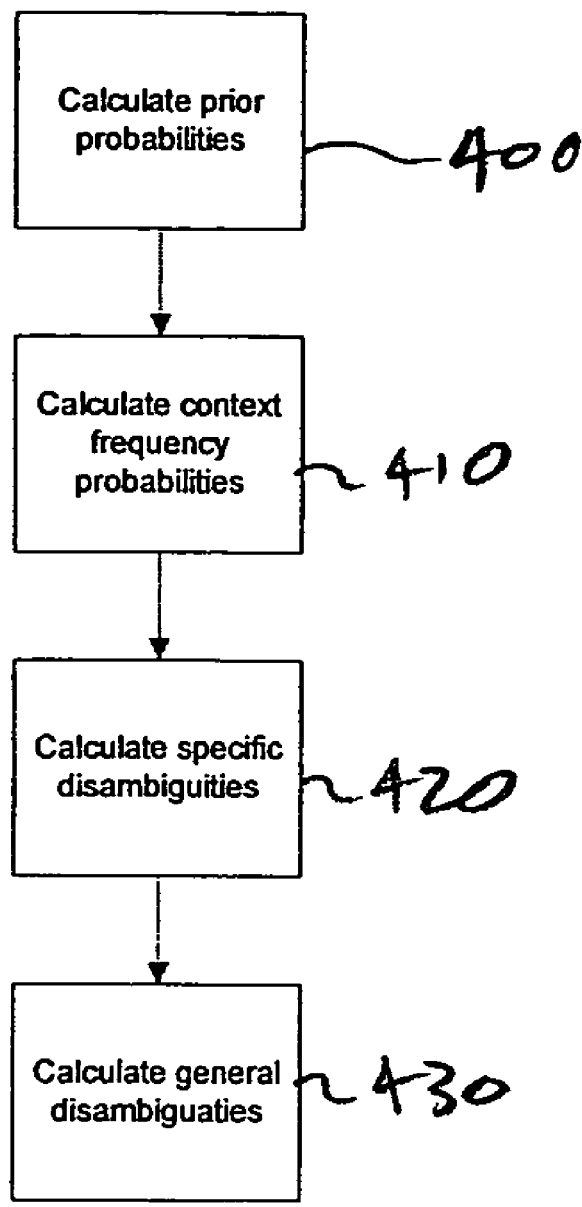
FIG. 4 is a flowchart illustrating exemplary operations of the natural language server.

FIG. 4 is a flowchart illustrating exemplary operations of the natural language server 114, which are also described in more detail below. At block 400, the natural language server 114 may calculate prior probabilities of the meanings for the words. The prior probability may include the likelihood that the word refers to a predetermined meaning, such as a determined person, place or thing, irregardless of the context in which the word is used. The prior probabilities may be determined from previous analysis of documents in which the words were analyzed to determine the probability that each word pertained to each possible meaning. At block 410, the natural language server 114 may also calculate the context frequency probabilities. The context includes the word or words that appear before and/or after the word for which the meaning is being determined. For each immediate context found in the search query input, the average probability may be determined of each attribute that any of the words in these contexts possessed. The average context frequency may be compared to the average prior probabilities to determine if the average is higher or lower than the prior probabilities. If the average for the context frequency is higher, the conditional probability for each attribute (e.g. meaning) is calculated.

At block 420, the natural language server 114 may also calculate specific disambiguitors for the word. The specific disambiguitors relate to whether the words or phrases increase the likelihood of a given meaning of a particular other word or phrase. This may be calculated in a similar way to the immediate context, such as whether the probability of a given outcome is significantly higher or lower than expected in the presence of a particular word or phrase. For example, YAHOO! may imply the place Sunnyvale, California, but not another place called Sunnyvale. These probabilities may be considered conditional upon the combination of prior probabilities and immediate context values, as described in more detail below. At block 430, general disambiguators may be calculated. If the specific disambiguators are aggregated across all related attributes (e.g., Sunnyvale is a U.S. town in California), it is determined whether there are any values that are significant across a whole attribute or meaning of the word.

For explanatory purposes, operation of the natural language server 114 will be described in terms of determining the probability that a word refers to a location. As noted above, however, the natural language server 114 can be used to identify words with other meanings. The prior probabilities (block 400), such as a location related probability, are determined for a word. The location related probability includes the probability that a word or phrase refers to a location. For example, if nine times out of ten the phrase "Washington" refers to a location then the location related probability for "Washington" is 90%.

The context frequency (block 410) may then be considered. As noted above, the context frequency relates to the ways the word is used in the context of other words surrounding the word. If a word or phrase precedes or follows a potential place name, the conditional probability that the potential place name refers to a location is calculated. For example: the phrase "a resident of Gary" implies that "Gary" refers to a place, but the phrase "George Washington" implies that "Washington" does not refer to a place. The natural language server 114 may determine, for example, that "a resident of <?>" had a context frequency value of 80% and that the context "George <?>" had a context frequency value of 0.1%.

The natural language server 114 may next utilize a combine function to analyze the results of the prior probability of the context frequency. The combine function is a mathematical function which can be used in the implementation of natural language disambiguation. This function is described herein with regard to the example, however other functions could be used, such as the "likelihood function" used in Bayes Theorem and other machine learning techniques. Given a prior probability and one or more context frequency values, the combine function may be determined as: —

$$Cmb(a, b) = \frac{a \cdot b}{a \cdot b + (1-a)(1-b)} \quad \text{(Equation 1)}$$

The function is associative. i.e.: —

$$Cmb(a,b,c) = Cmb(a, Cmb(b,c)) = Cmb(Cmb(a,b),c) \quad \text{(Equation 2)}$$

And commutative. i.e.: —

$$Cmb(a,b) = Cmb(b,a) \quad \text{(Equation 3)}$$

And may be generalized for any number of variables: —

$$Cmb(a_1, a_2, \ldots, a_n) = \frac{a_1 \cdot a_2 \cdot \ldots \cdot a_n}{a_1 \cdot a_2 \cdot \ldots \cdot a_n + (1-a_1)(1-a_1)\ldots(1-a_n)} \quad \text{(Equation 4)}$$

The combine function has the advantage that it may preserve certainties. i.e.: —

$$Cmb(1,x)=1 \quad \text{(Equation 5)}$$

$$Cmb(0,x)=0 \quad \text{(Equation 6)}$$

Combining two contradictory certainties (i.e. 0 and 1) leads to undefined behavior due to a division by zero.

The combine function may assume that the two numbers being combined are statistically independent, but may avoid problems that may be caused by this assumption. In most cases that number being combined are not statistically independent, but it is assumed that the number are independent while making some allowances for the fact that they are probably not. For example, values may be moderated for small samples. Extreme values may be generated from small samples (typically called "noise"). For example, if a coin were tossed once and landed on heads, it would be dangerous to conclude from this that the coin will always come up heads. Mathematically speaking: —

$$1/1=1=100\% \quad \text{(Equation 7)}$$

The values from small samples may be moderated by adding one to the numerator and two to the denominator: —

$$\text{Moderate}(n, d) = \frac{(n+1)}{(d+2)} \quad \text{(Equation 8)}$$

e.g.:-

$$\text{Moderate}(0, 0) = \frac{(0+1)}{(0+2)} = 0.5 = 50\% \quad \text{(Equation 9)}$$

$$\text{Moderate}(1, 1) = \frac{(1+1)}{(1+2)} = 0.666 = 67\% \quad \text{(Equation 10)}$$

$$\text{Moderate}(2, 2) = \frac{(2+1)}{(2+2)} = 0.75 = 75\% \quad \text{(Equation 11)}$$

$$\text{Moderate}(3, 3) = \frac{(3+1)}{(3+2)} = 0.8 = 80\% \quad \text{(Equation 12)}$$

In this way, it may be ensured that absolute certainty (i.e. 0% or 100% probabilities) can only be derived from an infinite sample.

Another way a achieving a similar effect may be to wait for a significant sample amount to appear. Given the richness in language constructs possible, however, this may not always be desirable as the resulting data set (in terms of context frequency and prior probabilities) may be too small to make the actual language recognition work. The amount of data which is needed to be tagged by human or other input to obtain desirable results from the natural language server 114 may be too large to be practical. While small data samples may be avoided because they often produce extreme values that may not be representative of general trends, moderation may allow for a small number of occurrences to have a statistical meaning.

The conditional probability may be calculated that a given context implies a location reference. For example, considering the preceding context "travel to" in the following cases:

"travel to New York"
"travel to London"
"travel to Austin"
"travel to Charles"

suppose the potential place names in the above cases had the following prior probability values:

TABLE 1

| Name | LRP Value |
|---|---|
| New York | 94% |
| London | 93% |
| Austin | 71% |
| Charles | 17% |

An average prior probability or expected value for the context "travel to" in these cases would be 68.75%. If another input, such as human input, determines that all the potential place names in the above examples referred to locations except the last case (i.e. "travel to Charles"), then the actual probability for this context may be 75%, e.g., three out of the four names refer to places in the context of "travel to" before the word. Because the actual probability is higher than the expected, it may be concluded that this context implies that the potential place name is more likely to be a location when used in this context. Values may be divided into two sets: "before" and "after" contexts. A number of words, such as four words, may be allowed in either direction (e.g. "now he lives in <?>" is a four word "before" context). Other context terms or symbols may be used, such as 'in', 'near', 'around' and the hyphen symbol.

To derive values that may sensibly be combined using the combine function, an inverse formula for the combine value may be derived. For example, having prior probability (P) and knowing the expected final probability (F), for a value (X) that may be combined with (P), the combine function may be used to return the expected final probability: CMB (P, X)=F and CmbInv (F, P)=X. If another function, such as the Bayes Theorem, was used instead of the combine function, the inverse of the Bayes Theorem may be used.

In the above example in Table 1, it may be determined what value is needed to combine with 68.75% to give a value of 75%. A formula is as follows:

$$CmbInv(c, a) = \frac{c(a-1)}{a(2c-1)-c}$$ (Equation 13)

Where "c" is the actual probability and "a" is the expected probability.
Note that:

$$CmbInv(c, c) = \frac{c(c-1)}{c(2c-1)-c}$$ (Equation 14)
$$= \frac{(c-1)}{(2c-2)}$$
$$= 1/2$$
$$= 0.5$$

-continued i.e.

$$Cmb(a, 0.5) = a$$ (Equation 15)

The value 0.5 may be referred to as the neutral context frequency as there is no effect when combined with the prior probability. If the context frequency value generated is too close to the neutral context frequency, they may be ignored as having too small an effect, such as those between 0.45 and 0.55 for example.

The context frequency values may be moderated for small samples. Because a given context may occur only a very small number of times, it may also be necessary to moderate the context frequency values, such as in a similar way to the prior probability values described above. Because the prior probability values may have already been moderated, the average prior probability may not be an extreme value but the actual probability may be extreme if not moderated. The following formula may be used to moderate context values:

$$ModerateContext(c, a, n) = \frac{(c \cdot n + a)}{(n+1)}$$ (Equation 16)

where "c" is the actual probability, "a" is the predicted value and "n" is the number of times the context was found.

If the prior probability moderation formula is used, the actual probability may be moderated towards 0.5. As a result the modified actual probability may be lower than the expected probability in cases where the original actual probability was 100%. Equation 16 modifies the actual probability to be more similar to the expected probability and thus may avoid this problem. The moderated value may then be used in the inverse combine function instead of the original, actual probability value. For example, an event may be more significant if it contradicts that general expectation than if it merely corroborate then. As an example, "he lives in Florida" is a location reference and "Richard Florida" is not a location reference. Because the word "Florida" is generally considered to refer to a location, more significance may be given to the context ("Richard"<?>") as it contradicts the expectation. If only one occurrence of the context "he lives in <?>" is found, this value may be moderated to avoid having too significant an effect. If moderated too much, however, the moderation may begin to appear to contradict the expectation for the word "Florida". Such a contradiction may be resolved by calculating a weighted average of the context probability and the expected prior probability value.

The above equations address the probabilities that indicate whether a potential place name is actually a location reference. There may be many distinct places, or persons or things, which share the same name. Such as 'apple' as a fruit and the APPLE computer. To disambiguate between places with the same name or the same name for different things, prior probabilities may be generated for all the possible meanings of each potential name. For example if there are thirty different places called "Springfield", then thirty-one prior probabilities may be generated, one for each place plus one for the possibility that it is not a place at all.

While the above equations use the context frequency values to indicate whether or not a word or phrase is a place name, the context frequency values may also be used to indicate more than this. Specific prior probabilities may be determined by examining, for example, an input generated training set (e.g. a set of documents that have been tagged with the precise meaning of each potential place name) and calculating what proportion of the uses of each potential place name refer to a given meaning. The training may be accomplished with human inputs or automatically, such as with a processor.

Figure 5:
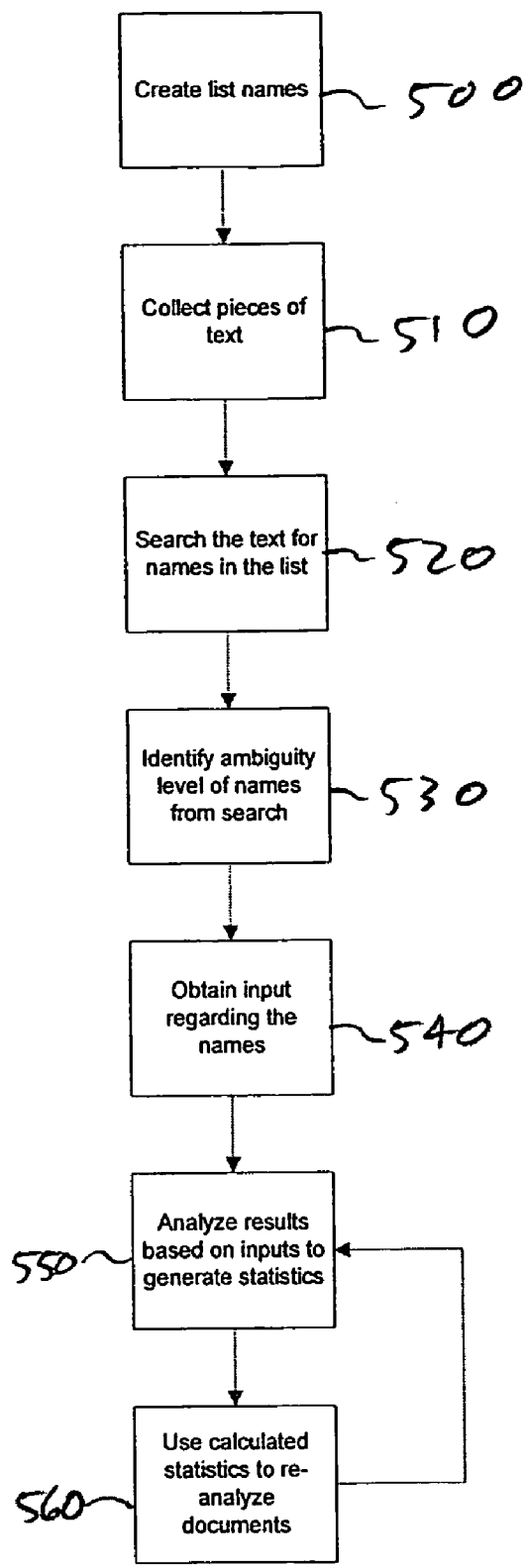
FIG. 5 is a flow chart illustrating the generation of a training set.

FIG. 5 is a flow chart illustrating the generation of a training set. At block 500, one or more lists of names to train may be created. This is a list of words to be disambiguated with each of their possible meaning and the attributes that relate to each meaning. For example, in the phrase "the capital of Denmark", the context "the capital of <?>" may indicate that this is a country in Europe or a country or state in the U.S. By assigning specific attributes to contexts and to places, these contexts may be applied when the attribute of the place in question matches the attribute of the context it is found in. The context may help to disambiguate between places with the same name but different attributes. The sets of attributes that may be used include: a. Place Type (Country, State, County, Town etc.), b. ISO Country Code (US, GB, FR, DE etc), c. Administrative Area Level 1 (i.e. State/Province/Region) e.g. US/Florida, US/California, CA/Ontario etc., d. Is a place, and e. Is not a place. Other examples include, in the phrase "the French town of Nancy", the context "the French town of <?>" may indicate that this is likely to be a town in France. In the phrase "Springfield, Illinois", the context "<?>, Illinois" may indicate this is a place in the state of Illinois. In the phrase "Winchester Crown Court", the context "<?> Crown Court" may indicate this is a place in England.

At block 510, text pieces are collected. The text pieces may include publications, such as articles, that may be collected on the Internet or from other sources. At block 520, a search of the text may be conducted for the selected names as they appear in the text. At block 530, the names with highly ambiguous meanings are identified, such as the names with many different meanings. To determine whether a name is highly ambiguous, when training a given place name, for example, the number of different places with that name may be counted. Supposing ten examples were selected of the use of a potential place name and the examples were disambiguated, if the same answer in all ten examples was giving, then it may be likely that the potential place name may be relatively ambiguous. If the answer given to every single example was different, then this name may be considered highly ambiguous.

At block 540, an input, such as from a human, may be obtained regarding the name. Questions may be presented to the human about the name, such as whether the name appears to be a place or not. An attribute may be associated with the name in accordance with the input, such as to indicate that the place is or is not a place, and where the place is located. At block 550, the results from may be analyzed to generate statistics. Table 2, for example, illustrates a proportion of place names that refer to a determined meaning.

TABLE 2

| Name | Meaning | Probability |
|---|---|---|
| "Springfield" | Springfield, Illinois | 46% |
| "Springfield" | Springfield, Missouri | 36% |
| "Springfield" | Springfield, Massachusetts | 11% |
| "Springfield" | Not a place | 7% |

In practice, the meaning of the word may be identified by a unique number rather than a description, as described in more detail below. At block 560, the calculated statistics may be used to re-analyze each document and/or new documents. As noted above, the context may appear before and/or after the word to be disambiguated.

Figure 6:
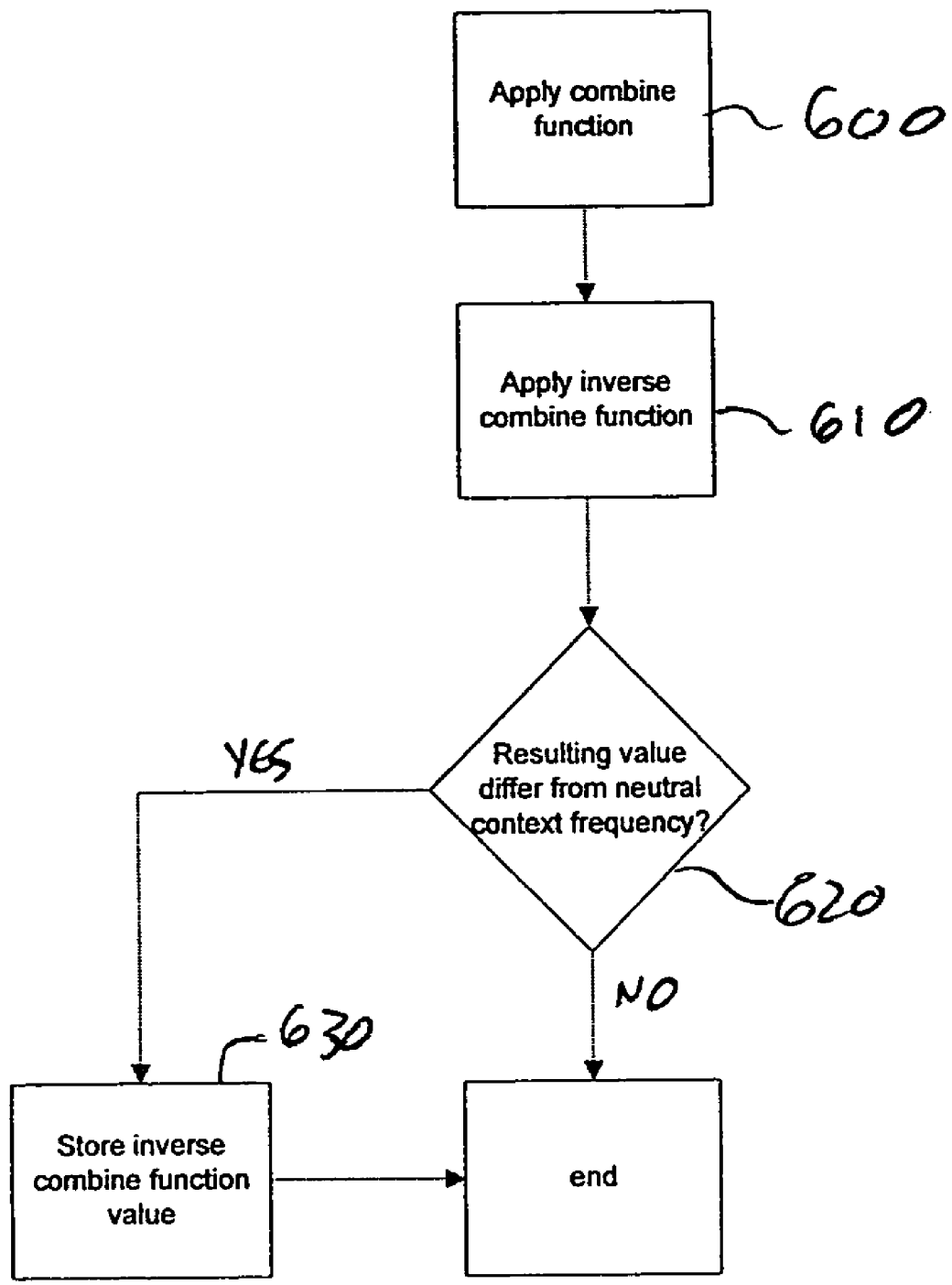
FIG. 6 is a flow chart of a process that may be used with double-sided contexts.

FIG. 6 is a flow chart of a process that may be used to decide whether results from a double-sided context taken together are significantly different from analyzing the sides of the contexts separately as the sum of its two sides. Sometimes consideration of the combination of double sided context frequency values, both "before" and "after" contexts, may be necessary because the value for the combination may be different from the statistically independent combination of the "before" and "after" context values. At step 600, the combine function is applied to the "before" and "after" context values. At step 610, the inverse combine function is applied to the double-sided context value and the combined value from the step 600. At block 620, it is determined if the resulting value is significantly different from the neutral context frequency (i.e. 0.5). At block 630, if the resulting value is significantly different, the value for the double-sided context is stored for later use. Table 3 shows exemplary results:

TABLE 3

| Context | Value |
|---|---|
| "of <?>" | 64% |
| "<?> died" | 70% |
| "of <?> died" | 99% |

Applying the combine function to 64% and 70% returns a value of 81%. Applying the inverse combine function to 99% and 81% gives us 96%. From this, it may be determined that the double-sided context is significantly greater than the combination of its parts, for example, greater than 55% or less than 45%. Therefore, the double-sided context of the term "of" before the word and the term "died" after the word may provide more accurate results than the two single-sided contexts viewed separately. Such double-sided contexts may be stored as double-sided contexts in memory.

When analyzing rare words, sometimes it may be useful to allow for wildcard words within a context. For example, when analyzing the phrase "John Byalistock of Washington", it may be unlikely that a context value will occur for "John Byalistock of". The rare words such as "Byalistock" may be ignored and context values for the phrase "John <*> of <?>" may be generated, which gives more information than the context "of <?>". The rarity skipping contexts may be generated in different ways such as by taking a first pass of all the text in a training set and performing a word count. When contexts are generated, words that are too rare may be passed over. Once values for all the contexts found within the text are collected, those words that appeared only once may be determined and a set of variants may be created of each one with each word skipped over in turn. Both approaches may be used simultaneously.

In the way that substitution tokens may be used to represent rare words, tokens may be used to represent the beginning and the end of a piece of text. Identification of the beginning and end of the text may be useful because documents may often start with the name of the place that the document is about. By using beginning and end tokens, the system may make use of this fact. This may be particularly true if the document is a search engine query.

Sometimes the clues that allow the system to disambiguate one meaning of a name from another are not in the immediate context of that name, but spread around a piece of text. For example, consider the phrases "The sun shone in Augusta on the first day of the US Masters", and "BANGOR—A convicted felon from Augusta was sentenced Monday for trading drugs in Massachusetts". In the first example, the phrase "US Masters" may imply Augusta, Gorgia. In the second example, the words "BANGOR" and "Massachusetts" may imply Augusta, Maine.

In the way that the system calculates context frequency values, the system may calculate specific disambiguators that help to disambiguate between different meanings of specific names. As described with statistical layering, the probabilities may be calculated as being dependent on the combination of a prior probabilities value and the context frequency. A risk was taken when making the assumption about the independence of the statistics being calculated, since there may be too many different values to be able to reasonably calculate the statistical relation between all of them. The values may be formed into groups and those groups may be placed in a determined order when calculating the relationship between the statistics in one group and those in the next group.

It may not be practical to generate specific disambiguator values for every place in the world, but general disambiguators may be generated that cover categories of places that share certain attributes. For example: —

TABLE 4

| Text | Attribute | Probability |
|---|---|---|
| "Californian" | State = US/California | 83% |
| "Gov. Arnold Schwarzenegger" | State = US/California | 78% |
| "Aussie" | Type = AU/Town | 81% |

The word "Californian" anywhere in a piece of text makes it 83% more likely that a place in California, USA is being referred to; the phrase "Gov. Arnold Schwarzenegger" may make it 78% more likely that a place in California, USA is being referred to and the word "Aussie" may make it 81% more likely that a town in Australia is being referred to. A list of attributes may be used for the general disambiguators. Values may calculated by aggregating together all the specific disambiguators that relate the places with a given attribute and storing the significant values for later use. Non-text disambiguators that are not within the text of a web-page or news article may also be used, such as the source or general category (e.g. Sports news, current affairs etc.). In the context of internet search queries the IP Address location of the searcher, or user registration information, could be used.

Figure 7:
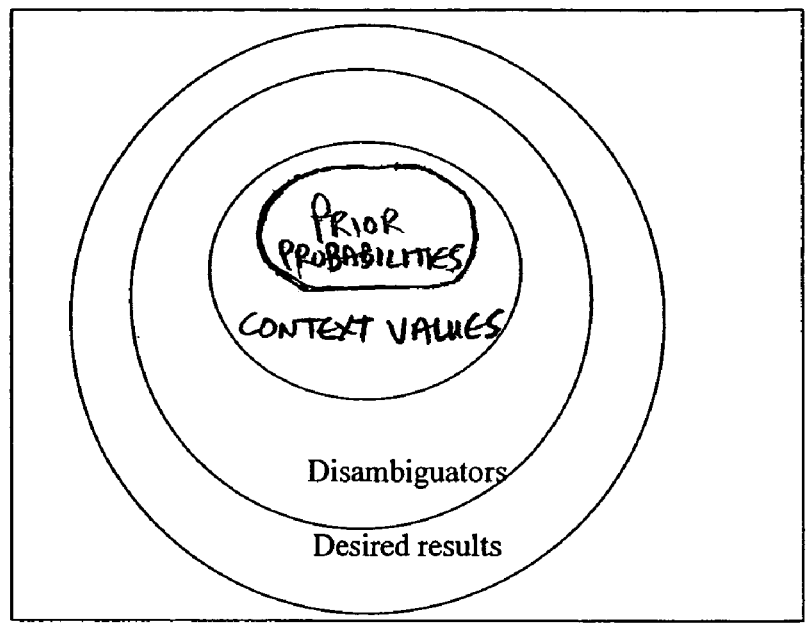
FIG. 7 is a diagram showing a relationship of the processes for determining the probability of the meanings of a word.

FIG. 7 is a diagram showing a relationship of the processes for determining the probability of the meanings of a word. Probability values in each layer may be calculated after the layer immediately inside of it. To generate statistics for prior probabilities and context frequencies, certain assumptions may be made about statistical independence. This may be necessary if a vast number of variables are involved. In the calculation of context frequencies, the calculations are not conditional on the expected prior probability, but may be used to help further determine the results that most likely match the meaning of the word of the user. Specific and general disambiguators may be considered to help further achieve the desired result of correctly determining the meaning of the word. The prior probability may be calculated to determine results that give the best match to the desired result of the searcher. The context frequency values may then be calculated that modify the predicated prior probability values to further determine a best match to the actual results. The disambiguator values may then be calculated to modify the combined prior probability and context frequency predicted values to give the best match to the desired results.

A normalization function may be used because, although the prior probabilities of all the distinct meanings of a potential place name sums to one, there is no guarantee that once modified using various context frequencies and disambiguators the prior probabilities will still sum to one. A set of probabilities may be normalized by dividing each member of the set by the sum of the whole set. Supposing the following prior probabilities were determined for the name "Garfield": —

TABLE 5

| Meaning | Probability |
|---|---|
| Town in New York | 25% |
| Town in Alberta | 25% |
| County in Utah | 25% |
| Not a place | 25% |

The phrase "in nearby Garfield County" and the context "in nearby <?>" may imply a place and "<?> County" may strongly imply that the place was a county. The following probabilities after the application of the context frequency values may result: —

TABLE 6

| Meaning | Probability |
|---|---|
| Town in New York | 50% |
| Town in Alberta | 50% |
| County in Utah | 99% |
| Not a place | 25% |

It would appear intuitive from these Table 6 that the county in Utah was the clear most probable meaning of the word but if divided through by the total the following values are obtained: —

TABLE 7

| Meaning | Probability |
|---|---|
| Town in New York | 22% |
| Town in Alberta | 22% |
| County in Utah | 44% |
| Not a place | 11% |

The apparent best probability now appears only marginally better than the rest of possible meanings. The combine function may be used to adjust all the probabilities by the same amount such that they are summed to one. Combining each value with 6%, for example, gives the following values: —

TABLE 8

| Meaning | Probability |
|---|---|
| Town in New York | 6% |
| Town in Alberta | 6% |
| County in Utah | 86% |
| Not a place | 2% |
| Total | 100% |

Use of the combine function satisfies the expectation that the county in Utah would be the most likely meaning and the total of all the possibilities is 100%.

The adjustment value required would not always be 6%, and may be calculated as now described. Calculating the number directly may be difficult because it requires solving an nth-order polynomial where n is the number of values in the set. Calculating an nth-order polynomial may be computationally difficult to accomplish for n=4 and extremely difficult for n>=5. There are over one hundred places with the name "Santa Maria", which may require the solution of a very complicated equation. The value may be derived iteratively in the following way.

$$P = \{p_1, p_2, \ldots p_n\} \quad \text{(Equation 17)}$$

$$T = p_1 + p_2 + \ldots + p_n$$

$$R = \frac{[(1-p_1)(1-p_2)\ldots(1-p_n)]^{1/n}}{(T-p_1)(T-p_2)\ldots(T-p_n)}$$

$$AdjustmentValue(P) = \frac{1}{1 + 1/R}$$

The variables T (total) and R (root) in the above equation are used as intermediate steps to make the equations easier both to implement and to represent on paper. Applying the adjustment value to the set P will not necessarily make the value sum to one but new adjustment values may be calculated and applied to the modified sets until the sum is sufficiently close to one, such as 0.99<T<1.01.

Dummy entries may also be used to calculate prior probabilities. When calculated, the prior probabilities may be moderated such as in the way location related probability values were moderated. Moderation may be accomplished by creating a dummy entry for each possible meaning of a word to start with a uniform distribution of probabilities across all possible meanings of the word. The distributions may then diverge from being uniform as more information becomes available.

To moderate the extreme values that can arise from analysis of small samples, context inertia may be used, such as the partial inheritance of values by longer contexts from their shorter relatives. Longer contexts are rarer than their shorter relatives. For example, the context "lived in <?>" may be rarer than "in <?>". In some circumstances, it may be assumed that longer contexts have similar meanings to their shorter relatives, but this is not always the case. For example, "President of <?>" may seem likely to imply a reference to a country, and "Vice President of <?>" might also, but "Senior Vice President of <?>" may be more likely to refer to role in a company than in a country.

Small samples of long contexts may be moderated by finding the immediate smaller relative (In the case of "Senior Vice President of <?>" the immediate smaller relative is "Vice President of <?>") and using its value to moderate the longer contexts value in a similar way to the moderation of context frequencies described above. Except a "context inertia" value may be allowed for that requires a certain weight of evidence before a longer context can be considered distinct in its meaning from its shorter relative. The formula:

$$ModerateLongerContext(c, a, n, i) = \frac{(c \cdot n + a \cdot i)}{(n+i)} \quad \text{(Equation 18)}$$

Where "c" is the longer context probability, "a" is the shorter context probability, "n" is the number of times the longer context was found, and "i" is the "context inertia" value. The context inertia value may be a determined constant, such as 4, but the value is implementation dependent and may be adjusted to make the system more or less sensitive to distinct meanings for longer contexts. The probability value for the longer context may be stored for future reference if it is sufficiently different from that of its shorter relative. The difference may be determined using the inverse combine function. It should be noted that double-sided contexts may have two immediate shorter relatives. The two values may be averaged to produce a single value that can then be used.

Contexts that occur rarely may be used or purged from the system as having only limited value. The inclusion of rare contexts may be detrimental as they use up space in memory while possibly offering relatively little benefit in terms of disambiguation. How often a context needs to appear before it becomes common enough may be decided on a performance versus accuracy basis—and this may become an operational consideration to optimize the memory space and execution time needed to archive the task of analyzing documents.

Figure 8:
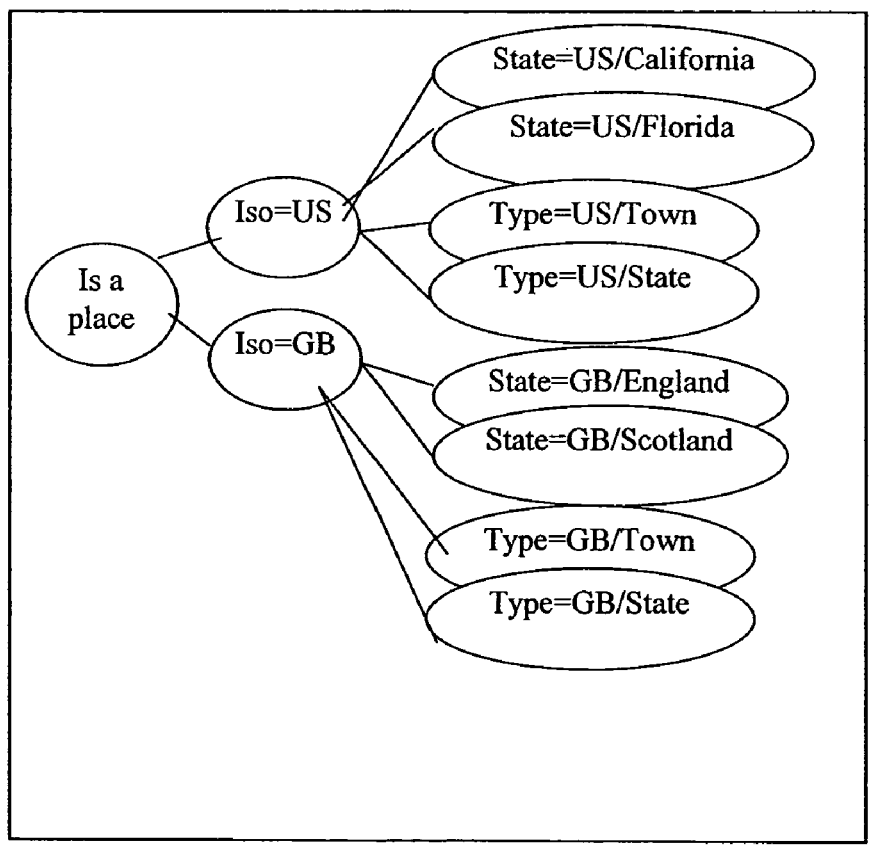
FIG. 8 is a block diagram illustrating an exemplary attribute hierarchy.

FIG. 8 is a block diagram illustrating an exemplary attribute hierarchy. Some of the attributes used in attribute specific contexts and general disambiguators may be subsets or other attributes. For example, State=US/California may be a subset of Iso=US. Likewise, all the attributes, except "Not a place", may be subsets of "Is a place". It may be the case that probabilities from a subset are not statistically independent from those within the superset. Using the inverse combine function, the effect of the superset may be removed from the subset and the values that differ significantly from the superset are maintained. To accomplish this, an attribute hierarchy may be defined, part of which is illustrated in FIG. 8. Each probability value may only need to be compared with the equivalent value in the immediate parent within the hierarchy.

Although individual words can be useful in disambiguation there are often phrases that can offer strong disambiguation. Potentially useful phrases may be identified by reviewing all articles that have been identified as having the same meaning for a particular name (e.g. "Washington" as in Washington, DC). All sequences of words are identified that are repeated within this set, except where the phrase is merely repeated as part of a longer repeated sequence of words. For example, "President George Bush" might be repeated several times and should be included, but the repeated phrase "President Dick Cheney" may not be included if the longer phrase "Vice President Dick Cheney" is repeated the same number of times.

The specific and general disambiguators rely upon "features", such as words or phrase that occur in pieces of text and which have a set of conditional probabilities associated with them. To avoid small samples creating a lot of noise, a feature correlation threshold may be set. For example, when generating conditional probabilities for each feature, all features may be excluded whose occurrence has a statistical correlation of less than a determined percentage, such as 5%, with any particular meaning of a potential place name. As such, common words like "the", "a" and "of" may be eliminated to reduce the amount of time and memory that may be needed to calculate a full set of conditional probabilities.

Assuming an extensive training set of text, such as news articles or web-pages that have had the potential place names disambiguated, such as by a human being, training-set statistics may be generated. In practice developing a large training set may be an extremely laborious process. This becomes clear when considering the vast number of place names in the world, the vast number of places that share their names with other places or with other entities (e.g. Cheddar, Champagne, Paisley, Dresden, Washington, Denver etc.). To perform the training efficiently, risk assessment and statistical example hunting may be used. Regarding the place name example, if each potential place name were considered separately, the number of examples needed before enough information was gathered may be determined. One factor to consider may be the volume of uses typically found in text. For example: —

TABLE 9

| Name | No. of results from Yahoo! Search | Priority |
| --- | --- | --- |
| New York | 1,000,000,000 | High |
| London | 560,000,000 | High |
| John | 1,000,000,000 | High |
| Jaszarokszallas | 16,000 | Low |
| Hincesti | 33,000 | Low |
| Bertacchi | 64,000 | Low |

Correctly disambiguating the more commonly used names may pay higher dividends than correctly disambiguating the rarer ones.

Figure 9:
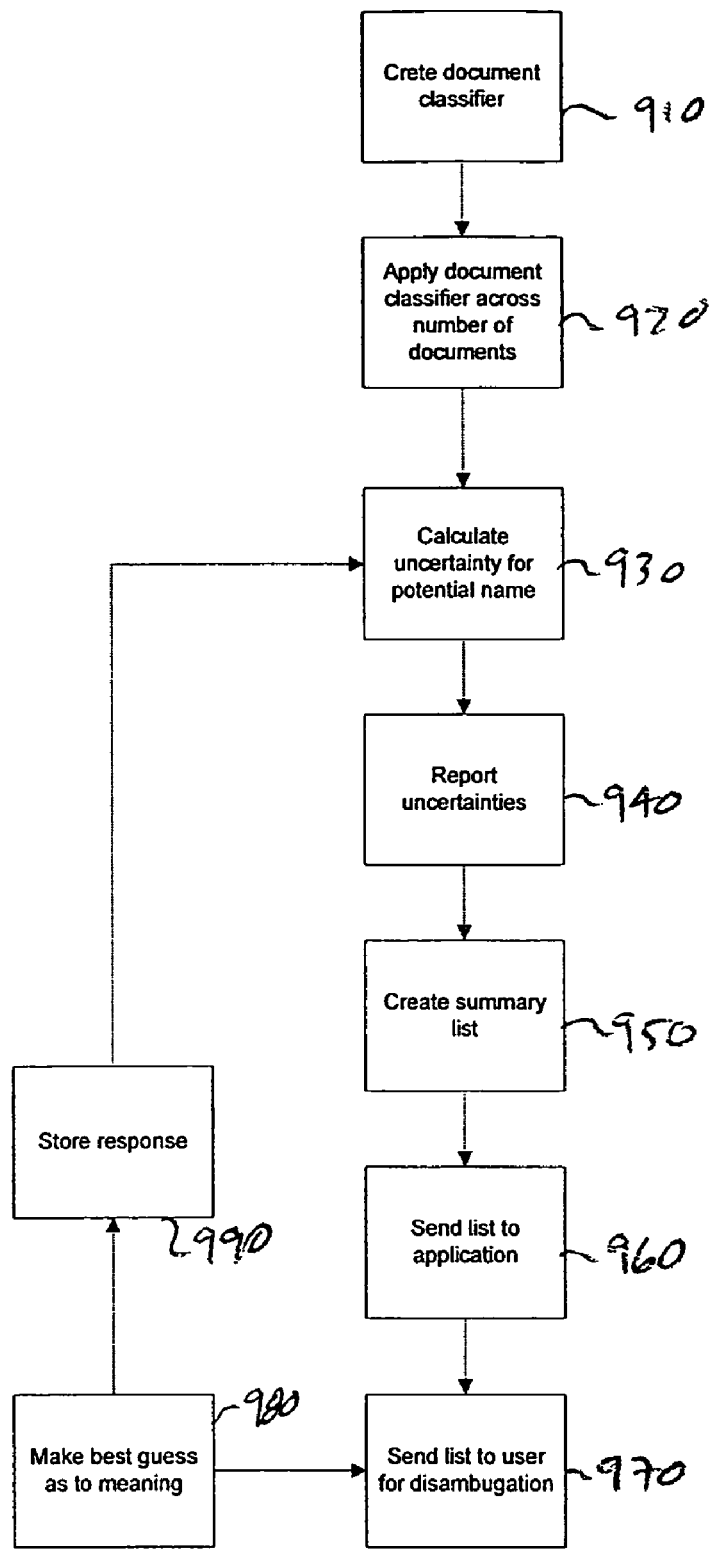
FIG. 9 is a flowchart illustrating an exemplary implementation of risk assessment and statistical example hunting.

FIG. 9 is a flowchart illustrating an exemplary implementation of risk assessment and statistical example hunting. At block 910, a document classifier may be created that has no context frequency values, or specific and general disambiguators yet generated. The data may include the potential place names with a uniform distribution of probabilities across all possible meanings, such as based on the dummy entries for each one. At block 920, the document classifier may be applied across a large number of documents, such as a million or two documents to start with. At block 930, for each potential place name discovered in the documents, an uncertainty may be calculated, such as in the following way: —

$$U = 1 - \max(p_1, p_2, \ldots p_n) \quad \text{(Equation 19)}$$

Where "U" is the uncertainty, and "p1, p2, . . . pn" are the probabilities of each of the possible meaning of a potential place name. Starting with a uniform distribution this may equate to: —

$$U = 1 - 1/n \quad \text{(Equation 20)}$$

At block 940, for efficiency, only uncertainties greater than a determined value, such as 0.25, may be reported. A minimum possible uncertainty during the initial run may be 0.5 (when n=2) so this is not an issue. At block 950, once the classifier is applied over all the documents a summary may be created, such as grouped by potential place name, of the uncertainty values with the following fields: —

Potential place name

Total uncertainty for this name

Max uncertainty for this name

Document ID of document with max uncertainty

The list may be sorted, for example, by decreasing total uncertainty. This list may be referred to as the "candidate list". At block 960, the candidate list may be sent to an application, such as a web application. At block 970, the application may present each document from the candidate list to a user with the potential place name highlighted. An optional list of possible meanings (including the extra options of: "Ambiguous Place", "Other place" [i.e. a place that is not currently present in the data], "Don't know") may also be passed. At block 980, the user makes a best guess as to the meaning of the name in the context of the document and submits a response. At block 990, the response may be stored in a file. The file may contain, for example, the following columns: —

Document ID

Potential place name

Selected meaning (i.e. unique place ID or "Not a place" etc.)

User name

The candidate list may be large, such as one entry for every potential place name that appears in any of the documents. It may not be essential that the user gives a response to every single case in the list. But once enough responses have been gathered from which to calculate the first set of location related probabilities, context frequencies and specific and general disambiguators, a second run of the document classifier may be started. Because the system may now have some knowledge on which to base its classification, at block 930, the system may begin to generate different uncertainty values for the cases that are similar to the ones that the user has already disambiguated. For the sake of efficiency, potential place name/Document ID combinations that have already been disambiguated by the user may be excluded from the generation of the candidate list.

The user may keep giving their response to the previous list while the classifier is running for the second time. Once the classifier has finished and a second candidate list has been produced the user can start responding to this new list and a third run can start, and so on. After a few iterations the system may have gained enough knowledge that it will stop presenting the user with the more obvious cases and start presenting more complex examples. In this way the system may leverage the knowledge gained to date in such a way that much of the tedium of manually disambiguating thousands of extremely similar cases is eliminated.

Word and phrase abstraction may be applied to context frequency values and disambiguators. Instead of allowing for rarity tokens and beginning and end of document tokens, a large array of abstract tokens may be developed that represent different possibilities. Consider the example: —"families from Broome, Delaware, Tioga, Tompkins and Chemung counties". Here "Tompkins" has no immediate context that strongly implies that it is a county. It may be determined that the word "counties" after "Chemung" strongly implies that this is a county. A context may be created that represents the idea that if "<Y>" is a county in the phrase "<X> and <Y>" then "<X>" is more likely to be a county. A context may also be created that represents the idea that if "<Y>" is a county in the phrase "<X>, <Y>" then this strongly implies that "<X>" is a county. Then the whole list may be traversed and it may be deduces that the names are all references to counties.

Consider the following example: —"Inspectors will visit all the schools in the Seminole, Orange and Miami-Dade school districts". There may be many places called "Orange" including eight counties and many places called "Seminole" including three counties. But there may be only one place in the data called "Miami-Dade", which is a county in Florida. An abstract context like the above example may be determined that allows the attributes of one entity to imply something about the attributes of another entity to solve the example.

Regarding nodal logic, in the examples above it is determined that analyzing the document is no longer just a case of doing a single pass of the text and identifying the potential place names, immediate contexts and disambiguators, but instead become a more complex process of deduction and substitution of conclusions backing into the next stage of deduction. An approach would be to use a "greedy" algorithm that used the strongest disambiguation values first, e.g. those values that are most different from 0.5, and then reconsider the situation in light of the assumptions. This may be accomplished by performing a first pass of the text and translating each word or word break (i.e. spaces or punctuation between words) with a number. A distinct number may be applied for each word that is known about and reserved numbers may be applied for unrecognized words or word breaks.

With the text represented as a sequence of numbers it may be easier to perform substitutions. For example, if the sequence "Phoenix, Arizona" is found, which may be represented by three numbers, this may be considered a sufficiently unambiguous name that it could be replaced by the number representing the word "Phoenix" with a single number that represents the unique concept of Phoenix, Arizona. Conversely if the sequence "Peter Phoenix" was found in the text it could be replaced by the number representing "Phoenix" with a number that represents the idea of a non-place. The system may also store a back-trace of the substitutions that have been performed so that the system can back out of dead-ends and try alternative options.

The system may also use atomized statistical layering. While the location related probability may generally be a more significant value than the other values such as the context, the layers may overlap. For example, if the phrase "of New York" is encountered at random in text then it may be assumed that "New York" is a location reference because it is a known phrase that has a high location related probability. The context "of <?>" seems consistent with this assumption but of secondary importance. On the other hand, if the phrase "John Rochester" is encountered in a piece of text it may be assumed that "Rochester" is not a location reference primarily based on the context "John <?>". The following example shows how the distinction may be important: —for example a training set of documents contains the following cases:

TABLE 10

| Phrase | Potential Place Name | No. of Occurances | Location Reference |
| --- | --- | --- | --- |
| "David Beckham" | Beckham | 1000 | No |
| "David Bunbury" | Bunbury | 100 | No |
| "David Overton" | Overton | 100 | No |
| "in nearby Bunbury" | Bunbury | 1 | Yes |

If the moderated location related probability values are calculated for each of the potential place names, the following set of values occurs: —

TABLE 11

| Potential Place Name | LRP |
| --- | --- |
| Beckham | 1/1002 = 0.001 |
| Bunbury | 2/103 = 0.02 |
| Overton | 1/102 = 0.01 |

These values work out with respect to getting the correct classification in the previous table with the exception of the last case "in nearby Bunbury" unless a very high context frequency value is derived for "in nearby <?>", which is not likely for only one example.

If the context as the primary layer was determined instead and calculated their moderated values may be as follows: —

TABLE 12

| Context | Context Frequency Value |
| --- | --- |
| "David <?>" | 1/1202 = 0.0008 |
| "in nearby <?>" | 2/3 = 0.667 |

If the location related probability for "Bunbury" may be determined as conditional on the context frequency value: —

$$\text{Predicted probability} = \frac{100 \times 0.0008 + 1 \times 0.667}{101} \quad \text{(Equation 21)}$$
$$= 0.0074$$

$$\text{Actual location related probability} = 1/101 = 0.0099 \quad \text{(Equation 22)}$$

Using the context moderation formula: —

$$\text{Moderated Value} = \frac{0.0099 \times 101 + 0.0074}{101 + 1} \quad \text{(Equation 23)}$$
$$= 0.0099.$$

If the inverse combine formula is used: —

$$CmbInv(0.0099, 0.0074) = 0.572 = 57.2\% \quad \text{(Equation 24)}$$

So a location related probability of 57% has been derived for Bunbury. Looking back at the original example, a strong context for "David <?>" is observed that is more than strong enough to stop "David Bunbury" from being classified as a location. But the combination of 57% location related probability for "Bunbury" and 67% for context "in nearby <?>" may give a 73% probability for this being a location reference, which would provide a match to the desired answer. All the other "David <?>" examples return very low probabilities of being location references.

It is sometimes better to make the context the primary statistical layer. To determine this, a first pass of the training set may be conducted and statistically independent values may be calculated for all possible disambiguators. A second pass may then be accomplished and the strongest disambiguator may be selected in each case, i.e. the value furthest from the neutral value of 0.5. The value may be accumulated for the remaining disambiguators relative to the first, or even a sequence of disambiguators, as dependent on the next strongest.

Regarding a missing place name and place attribute generation, it may be difficult to analyze every place name in the world including all possible variants of known names (e.g. LA for Los Angeles). Therefore, the system may identify missing place names from the documents in an automated way. Once we a reasonably strong set of context values is developed, the set may be used to search for plausible place names, e.g. starting with a capital letter, and the system may evaluate the probability of them actually being place names from the strength of the contexts that they are found in. In this way, it is also possible to extrapolate location related probability values for place names that have not been researched, if the average probability of the context that they are found in is considered.

Figure 10:
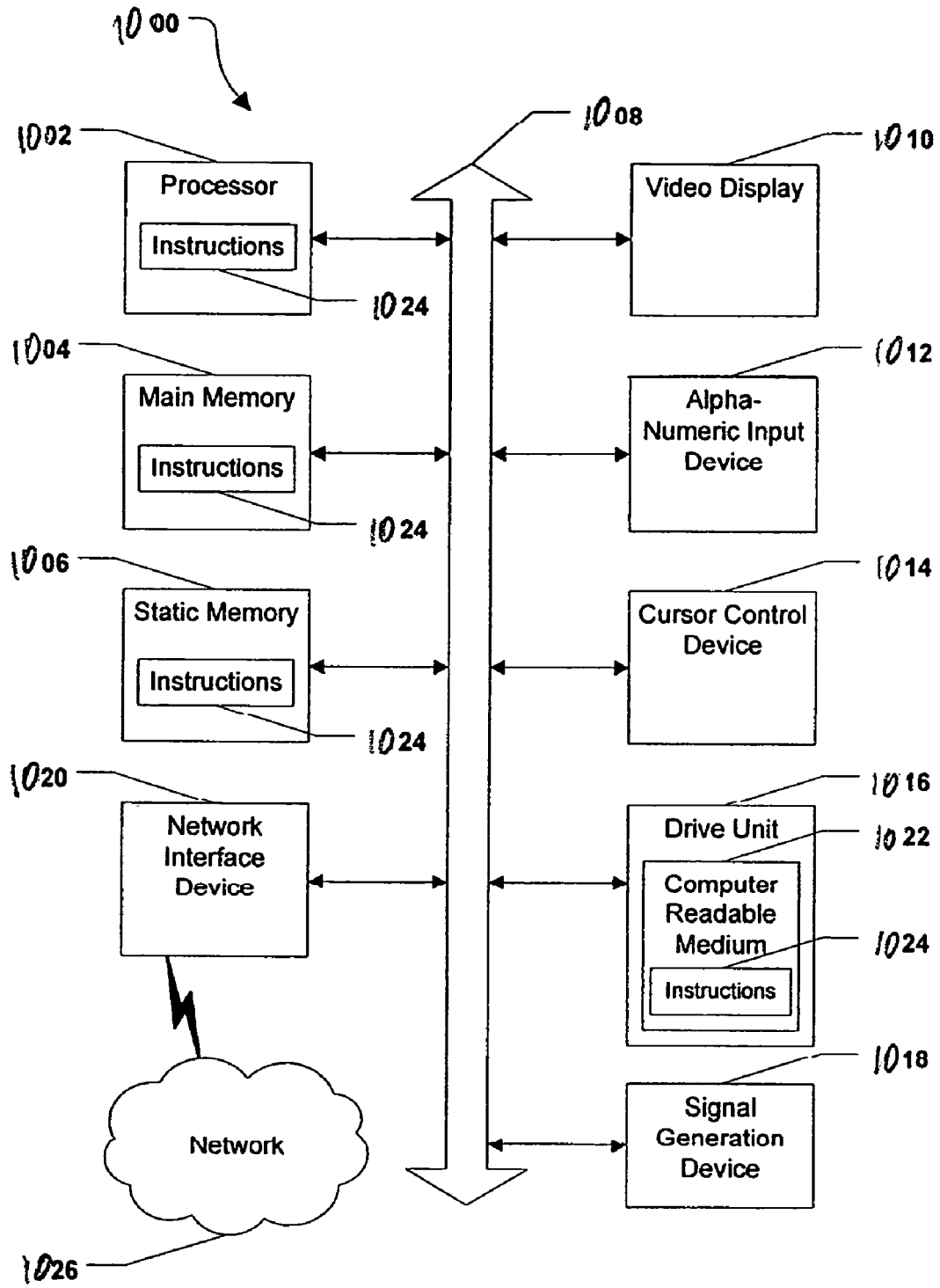
FIG. 10 is a block diagram of an exemplary general computer system.

FIG. 10 is an illustrative embodiment of a general computer system 1000, such as the computer systems used for the natural language server 114 and other components of the environment 100. The computer system 1000 can include a set of instructions that can be executed to cause the computer system 1000 to perform any one or more of the computer based functions disclosed herein. The computer system 1000 may operate as a standalone device or may be connected, e.g., using a network, to other computer systems or peripheral devices. Suitable operating systems include any of the MICROSOFT WINDOWS suite including XP, NT and DOS.

Other operating systems may be used such as UNIX or LINUX, and the program may be invoked from another program such as an Application Program Interface (API). Furthermore, alternative software implementations may be used including, but not limited to, distributed processing or component/object distributed processing, parallel processing, or virtual machine processing can also be constructed to implement the tools described herein.

In a networked deployment, the computer system may operate in the capacity of a server or as a client user computer in a server-client user network environment, or as a peer computer system in a peer-to-peer (or distributed) network environment. The computer system 1000 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a television, a network router, switch or bridge, or any other machine capable of executing a set of instructions (sequential or otherwise) that specify actions to be taken by that machine. In a particular embodiment, the computer system 1000 can be implemented using electronic devices that provide voice, video or data communication. Further, while a single computer system 1000 is illustrated, the term "system" shall also be taken to include any collection of systems or sub-systems that individually or jointly execute a set, or multiple sets, of instructions to perform one or more computer functions.

On an interconnected set of local area networks (LAN), including networks employing differing protocols, a router may act as a link between LANs, enabling messages to be sent from one to another. Communication links within LANs typically include twisted wire pair or coaxial cable. Communication links between networks may generally use analog telephone lines, full or fractional dedicated digital lines including T1, T2, T3, and T4, Integrated Services Digital Networks (ISDNs), Digital Subscriber Lines (DSLs), wireless links including satellite links, or other communication links. Remote computers and other network-enabled electronic devices may be remotely connected to LANs or WANs by way of a modem and temporary telephone link.

In FIG. 10, the computer system 1000 may include a processor 1002, e.g., a central processing unit (CPU), a graphics processing unit (GPU), or both. Moreover, the computer system 1000 can include a main memory 1004 and a static memory 1006 that can communicate with each other via a bus 1008. The computer system 1000 may further include a video display unit 1010, such as a liquid crystal display (LCD), an organic light emitting diode (OLED), a flat panel display, a solid state display, or a cathode ray tube (CRT). Additionally, the computer system 1000 may include an input device 1012, such as a keyboard, and a cursor control device 1014, such as a mouse. The computer system 1000 can also include a disk drive unit 1016, a signal generation device 1018, such as a speaker or remote control, and a network interface device 1020.

In FIG. 10, the disk drive unit 1016 may include a computer-readable medium 1022 in which one or more sets of instructions 1024, e.g. software, can be embedded. Further, the instructions 1024 may embody one or more of the methods or logic as described herein. The instructions 1024 may reside completely, or at least partially, within the main memory 1004, the static memory 1006, and/or within the processor 1002 during execution by the computer system 1000. The main memory 1004 and the processor 1002 also may include computer-readable media.

Dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

A computer-readable medium is contemplated that includes instructions 1024 or receives and executes instructions 1024 responsive to a propagated signal, so that a device connected to a network 1026 can communicate voice, video or data over the network 1026. Further, the instructions 1024 may be transmitted or received over the network 1026 via the network interface device 1020.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

The computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions.

Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

To clarify the use in the pending claims and to hereby provide notice to the public, the phrases "at least one of <A>, <B>, ... and <N>" or "at least one of <A>, <B>, ... <N>, or combinations thereof" are defined by the Applicant in the broadest sense, superceding any other implied definitions herebefore or hereinafter unless expressly asserted to the contrary, to mean one or more elements selected from the group comprising A, B, ... and N, that is to say, any combination of one or more of the elements A, B, ... or N including any one element alone or in combination with one or more of the other elements which may also include, in combination, additional elements not listed.

The above disclosed subject matter is to be considered illustrative, and not restrictive, and the appended claims are intended to cover all such modifications, enhancements, and other embodiments, which fall within the true spirit and scope of the present embodiments. Thus, to the maximum extent allowed by law, the scope of the present embodiments is to be determined by the broadest permissible interpretation of the following claims and their equivalents, and shall not be restricted or limited by the foregoing detailed description.

We claim:

1. A method for determining probable meanings of a word, the method comprising:
    establishing a prior probability of the probable meanings of the word;
    establishing a context frequency probability of the probable meaning of the word;
    providing, by a processor, the probable meanings of the word including the probability that each meaning is a correct meaning in accordance with a combination of both the prior probability and the context frequency probability; and
    establishing disambiguators in accordance with a text in which the word is used, where the disambiguators modify the combination of the prior probability and the context frequency probability,
    wherein establishing disambiguators includes assigning at least one attribute to a context of the word and to places, and applying the context of the word when the attribute of a place in question matches attributes of the context of the word.

2. The method of claim 1, wherein the context frequency probability comprises at least one of:
    the meaning of the word in a context of terms immediately preceding or immediately following the word, and
    the meaning of the word in a context of terms both immediately preceding and immediately following the word.

3. The method of claim 1, wherein the prior probability comprises at least one of:
    a probability that the word refers to a predetermined meaning irregardless of the context in which the word is used, and
    a location related probability which includes the probability that the word refers to a location.

4. The method of claim 1, wherein the prior probability and the context frequency probability are combined using combine mathematical function.

5. The method of claim 1 wherein establishing a context frequency probability further comprises calculating a conditional probability that a given context implies a predetermined meaning of the word.

6. The method of claim 5 further comprising performing a training of the meanings of the words to determine an actual probability that a given context implies a predetermined meaning of the word.

7. The method of claim 6 further comprising applying an adjustment value to normalize the probabilities of the meaning of the words, wherein the adjustment value is determined by an iterative mathematical process, not directly.

8. The method of claim 1 wherein the disambiguators comprise at least one of:
    specific disambiguators which include the meaning of the word as determined in a context of a text that includes the word, other than the text immediately preceding or following the word; and
    general disambiguators which includes a term in a text that uses the word, wherein the term shares an attribute with the word being disambiguated.

9. The method of claim 1 further comprising determining an immediate small relative context to moderate a long context.

10. The method of claim 9 further comprising storing a probability value for the long context only if sufficiently different from the small context.

11. The method of claim 1, further comprising receiving input from a user, the input being indicative of the meaning of the word when the prior probability of the meaning of the word cannot be established.

12. The method of claim1, further comprising
    ignoring a word in a sequence of words when the established probability of the meaning of the word indicates that the word is a rare word.

13. The method of claim 1, wherein determining the prior probability of the meaning of the word further comprises determining whether the word is substantially at the beginning or the end of a sequence of words.

14. A system to determine probable meanings of a word comprising:
   means for establishing a prior probability of the probable meanings of the word;
   means for establishing a context frequency probability of the probable meaning of the word;
   means for providing, by a processor, the probable meanings of the word including the probability that each meaning is a correct meaning in accordance with a combination of both the prior probability and the context frequency probability; and
   means for establishing disambiguators in accordance with a text in which the word is used, where the disambiguators modify the combination of the prior probability and the context frequency probability,
   wherein establishing disambiguators includes assigning at least one attribute to a context of the word and to places, and applying the context of the word when the attribute of a place in question matches attributes of the context of the word.

15. The system of claim 14, wherein the context frequency probability comprises the meaning of the word in a context of terms immediately preceding or immediately following the word.

16. The system of claim 14, wherein the prior probability comprises a probability that the word refers to a predetermined meaning irregardless of the context in which the word is used.

17. The system of claim 14 further comprising means for applying an adjustment value to normalize the probabilities of the meaning of the words, wherein after the adjustment value is applied, all of the probabilities of the possible meanings of the words are summed to equal about one-hundred percent, and the adjustment value is determined by an iterative mathematical process, not directly.

18. The system of claim 14 further comprising means for establishing a disambiguators in accordance with a text in which the word is used.

19. The system of claim 18 wherein the disambiguators comprise specific disambiguators which include the meaning of the word as determined in a context of a text that includes the word, other than the text immediately preceding or following the word.

20. The system of claim 18 wherein the disambiguators comprise general disambiguators which includes a term in a text that uses the word, wherein the term shares an attribute with the word being disambiguated.

* * * * *